Patented Oct. 28, 1930

1,779,715

UNITED STATES PATENT OFFICE

WINFIELD SCOTT, OF AKRON, OHIO, ASSIGNOR TO THE RUBBER SERVICE LABORATORIES COMPANY, OF AKRON, OHIO, A CORPORATION OF OHIO

MANUFACTURE OF RUBBER VULCANIZATION ACCELERATORS

No Drawing. Original application filed October 9, 1925, Serial No. 61,587. Divided and this application filed March 2, 1927. Serial No. 172,200.

The present invention relates to the manufacture of organic salts of mercaptan compounds and particularly to the manufacture of the reaction product of a mercapto-aryl-thiazole and like compounds with a fully saturated organic base such as saturated aliphatic amines and the like. Such fully saturated compounds are of the type wherein no two atoms present in the compound are linked or joined together by more than one bond or valence. The invention will be understood from the following description and examples wherein the invention is fully set forth and described.

Organic salts of the type mentioned have been found to comprise products that are valuable for use as accelerators of the rubber vulcanization process as are set forth and claimed in an application Serial No. 61,587 filed by me Oct. 9, 1925. The present application is a division of the application referred to.

Mercapto-benzo-thiazole having the formula

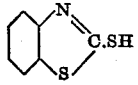

is one of the reaction products obtained by heating a mixture of thiocarbanilid and sulphur. I have found that the usefulness of this compound and all analogous materials as accelerators in the rubber vulcanization process can be greatly increased by reacting such compounds with organic bases of the type hereinafter described to produce organic salts and using the material so obtained as vulcanization accelerators.

Mercapto compounds are somewhat acidic in nature due to the presence of the —SH group contained therein, and will, therefore, form salts of various metals, such as sodium, zinc, lead and the like, and will also react with the more stable and less volatile of the organic bases to form compounds which may be termed organic salts. These organic salts possess particularly valuable characteristics as accelerators of the rubber vulcanization process as has been set forth in my earlier application referred to. The present application is concerned with the manufacture of the reaction products of mercaptans with bases, whereby the mercaptan is so treated as to decrease its natural acidity or conversely to increase its basicity.

Various types of fully saturated organic materials may be employed to decrease the acidic nature of mercapto compounds. One preferred type of materials employed for the object set forth comprises the fully saturated organic condensation products of ammonia, that is, fully saturated compounds produced by the direct union of an organic compound such as an aliphatic aldehyde with ammonia, either by condensation or by addition reactions. The aldehyde ammonia reaction products, although not very strongly basic of themselves, will react with aromatic mercapto compounds and particularly with the mercapto-thiazole derivatives to produce compounds having desirable vulcanization accelerating properties. Hexa-methylene-tetramine $(CH_2)_6.N_4$, for example, reacts slowly with mercapto-benzo-thiazole at temperatures ranging from 140 to 225° C. to produce a dark, resinous product. At temperatures somewhat above 225° C., decomposition of the material is liable to occur, accompanied by the evolution of substantial quantities of gases, such as hydrogen sulphide, thereby producing a hard, carbonized resinous material having impaired accelerating value.

One method of preparing a reaction product possessing desirable properties for the object desired, comprises heating a mixture of approximately 140 parts hexa-methylene-tetramine (dry or in aqueous solution, as preferred), with approximately 165 parts of mercapto-benzo-thiazole at a temperature of 150° C. or thereabout, for approximately an hour, during which time a reaction takes place. After the initial reaction is over, the mixture is heated to about 200° C. and maintained thereat for a period of about four hours, whereupon, after cooling, a dark, resinous product is obtained which can be ground to a dark brown powder.

Other means of carrying out the reaction described above may, of course, be employed. Thus, in place of hexa-methylene-tetramine in crystalline form, I have used an aqueous solution thereof, prepared, for example, by saturating the necessary quantity of commercial formaldehyde solution with ammonia. Other aldehyde-ammonia compounds have likewise been used, but because of their volatility it is then usually necessary to use a closed reaction vessel to prevent loss of a portion of the interacting substances. If preferred, the entire reaction may be carried out in a closed reaction vessel, and the mixture heated at once to approximately 200° C., but if this be done, the volatile reaction products should be removed after the reaction is completed, by means of a vacuum, or by open heating at about 200° C. Other proportions of the reacting ingredients may also be employed than those mentioned above. Thus, instead of reacting equi-molecular parts of the materials as shown, I have combined one proportion of hexa-methylene-tetramine with one, two and three molecular proportions of the mercaptan.

Other bases than those set forth have been made and combined advantageously with a mercaptan to prepare compounds of the type mentioned, and which possess desirable vulcanization accelerating characteristics. Thus, as examples of such bases, I may employ fully saturated organic bases, that is, bases containing within the molecule no two atoms joined to one another by more than a single bond or valence. Such bases are necessarily of the aliphatic series of compounds and comprise the organic ammonium derivatives such as tetra-methyl-ammonium hydroxide $N(CH_3)_4 \cdot OH$ and like compounds, primary and secondary amines such as piperidine and the like, secondary di-amines, for example, piperazine

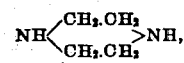

tri-methyl-sulphonium hydroxide $(CH_3)_3 \cdot S \cdot OH$, as well as other organic compounds possessing basic properties.

Furthermore, it is to be understood that while I have specifically mentioned mercapto-benzo-thiazole as an example of a mercaptan, other compounds may, as I have found, be used successfully for the preparation of my preferred type of accelerators. Thus, I may use, as a mercaptan compound, the aliphatic mercaptans such as ethyl mercaptan, butyl mercaptan, and the like, aromatic mercaptans, such as thio-phenol, thiocresol and the like; benzo-thiazole mercaptans and substitution products thereof; such as mercapto-tolyl-thiazole, the naphthyl-thiazole mercaptans; thio-oxy-indole

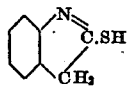

and substitution products thereof; amido-thio-phenols and derivatives; 2-mercapto-thiazolin

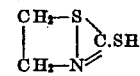

and derivatives; the thio-anilides

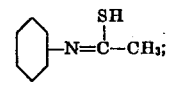

2-mercapto-benzimid-azol; mercapto-imina-zole

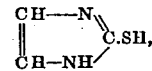

the thio-amides, such as thio-ammelin

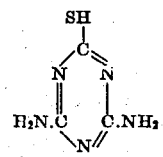

that is mercapto compounds of the aliphatic and aromatic series.

My invention then, covers broadly the manufacture of reaction products of a type particularly useful as rubber vulcanization accelerators, which products are formed by the reaction of saturated organic bases with compounds of the aromatic or aliphatic series containing the $-SH$ grouping, that is, the mercaptans and mercaptan derivatives. The invention is to be understood as not limited to the exact procedure followed or proportions employed in the foregoing examples, which are illustrative only and not limitative of my invention. Moreover, the invention is to be considered as not limited by any theories advanced in explanation of the chemical changes involved in the manufacture of the compounds set forth but is limited solely by the claims attached hereto as a part of this specification wherein I intend to claim all novelty inherent in my invention as is permissible in view of the prior art.

What I claim is:

1. The process of manufacturing an organic salt of a mercaptan which comprises heating a mercaptan with a fully saturated organic condensation product of ammonia at a temperature below the decomposition point of the materials.

2. The process of manufacturing a mercaptan derivative which comprises heating a compound containing the

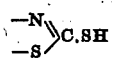

group with a fully saturated organic base.

3. The process of manufacturing a mercaptan derivative which comprises heating a mercapto-aryl-thiazole compound with an equi-molecular proportion of a fully saturated organic condensation product of ammonia.

4. The process of manufacturing a mercaptan derivative which comprises heating mercapto-benzo-thiazole with from 1/3 to 1 molecular equivalents of hexa-methylene-tetramine.

5. As a new product the mercaptan derivative comprising the reaction product of a mercaptan with a fully saturated organic condensation product of ammonia.

6. As a new product the mercaptan derivative comprising the reaction product of a mercapto-aryl-thiazole compound with an equi-molecular proportion of a fully saturated organic condensation product of ammonia.

7. As a new product the mercaptan derivative comprising the reaction product of mercapto-benzo-thiazole with from 1/3 to 1 molecular equivalents of hexa-methylene-tetramine.

8. As a new product the mercaptan derivative comprising the reaction product of a compound containing the

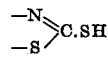

group with a fully saturated organic base.

In testimony whereof I affix my signature.
WINFIELD SCOTT.